Jan. 10, 1928.
J. POYET
1,656,074
AUTOMATICALLY VARIABLE FLEXIBLE SUSPENSION FOR VEHICLES
Filed Jan. 26, 1925     2 Sheets-Sheet 2
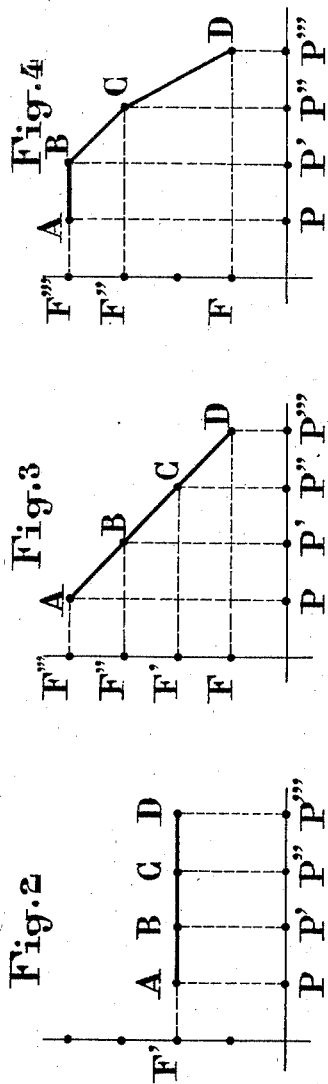
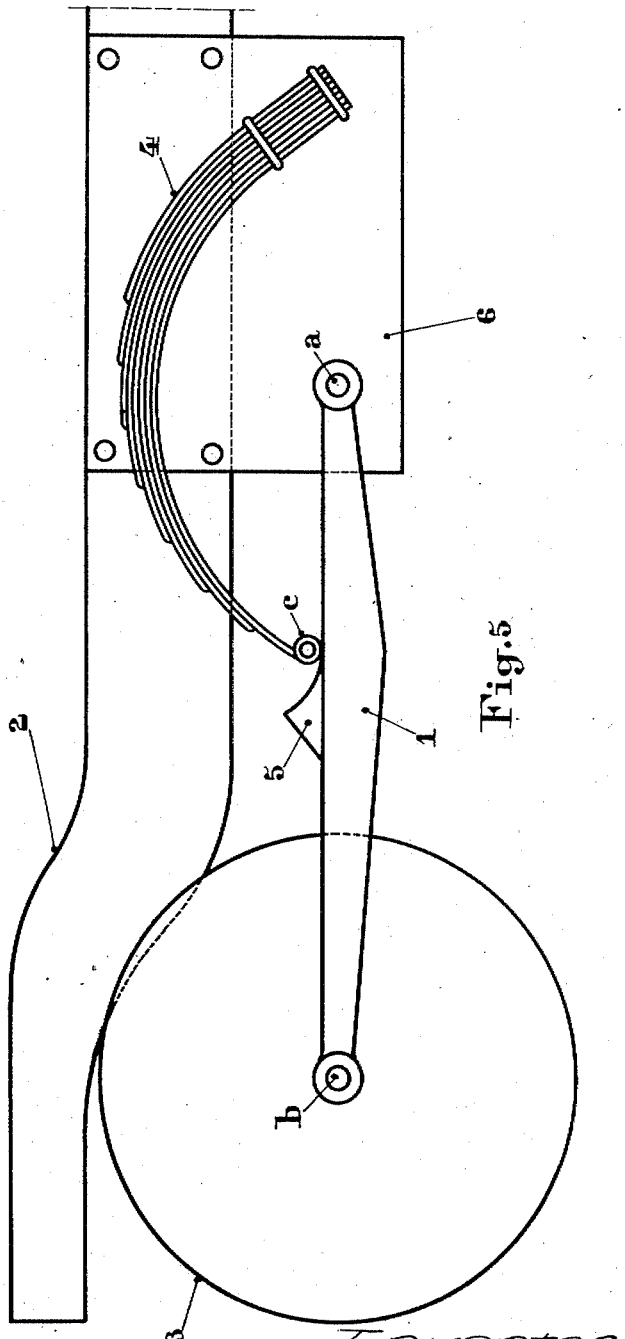
Inventor
J. Poyet
by Langner, Parry, Card & Langner
Attys.

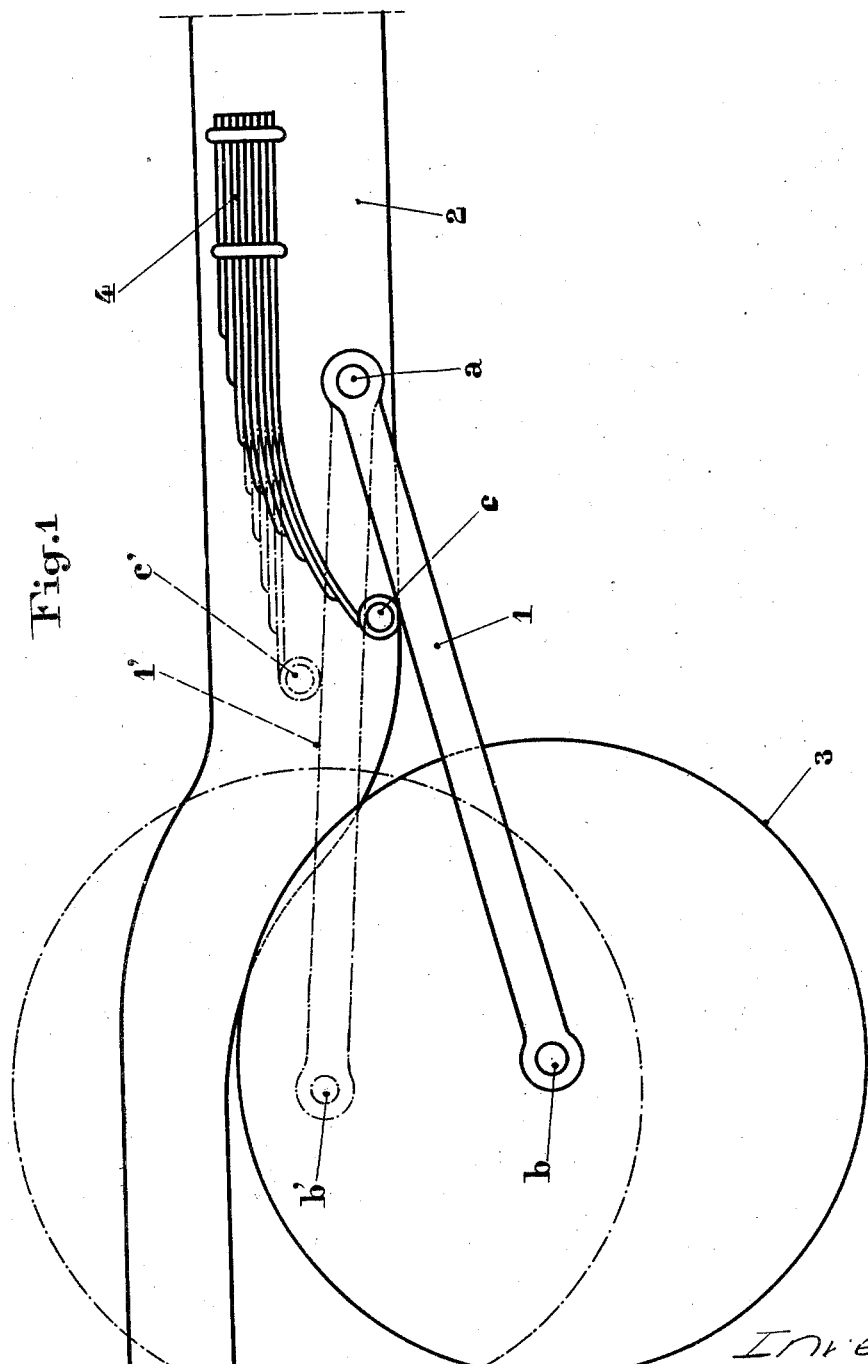

Patented Jan. 10, 1928.

1,656,074

UNITED STATES PATENT OFFICE.

JACQUES POYET, OF LEVALLOIS-PERRET, FRANCE.

AUTOMATICALLY-VARIABLE FLEXIBLE SUSPENSION FOR VEHICLES.

Application filed January 26, 1925, Serial No. 4,912, and in France January 31, 1924.

The suspension of a vehicle, and particularly that of an automobile vehicle, is a function of its period of oscillation which increases with the load and the flexibility. A good suspension, under different loads which it is adapted to support, should have periods of oscillation included between a maximum limit and a minimum limit. But for a vehicle under consideration the flexibility of the suspension remaining constant, the differences in load alone intervene and they may lead to such variations of the period of oscillation that it frequently becomes impossible to remain within these limits; this disadvantage becomes more noticeable when the vehicle is lighter and the variations of the load are greater.

In these latter cases, in particular with a suspension of slight flexibility, a vehicle may be sufficiently well suspended under a total load whilst being badly suspended under a partial load.

With a suspension of great flexibility the vehicle may be well suspended with a partial load but not so well under a total load, but a vehicle thus suspended has numerous disadvantages of which the principal are: the raising of the centre of gravity by reason of the increase and of the loss of movement under load and the increase of vibration due to the bad equilibrium of the vehicle; the bad condition of the road, the vehicle tending to set when turning; exaggerated movements of rolling and pitching; a relatively considerable difference between the height of the vehicle when empty and the height of the same vehicle under a full load.

The present invention has for its object to remedy these disadvantages by varying the flexibility of the suspension in operation and under the action of the load itself, the flexibility decreasing in proportion to the increase of load, this result being obtained by the application of general means which consist in varying, by the action of the extension of a spring weighed down under the load, the ratio of a reducing system interposed between the wheel and the spring.

This reducing system with variable reduction may be carried out in various ways and more particularly by means of a lever which supports the wheel at one of its ends and may oscillate freely on the chassis at its other end, the spring bearing upon the lever at an intermediate point of this latter and the point of support being capable of moving on the said lever, by reason of the provision of a roller or any other device enabling free movement, in such a manner that when the spring extends when being weighed down under the influence of the load, the said intermediate point will move on the lever which causes a variation of the ratio of the arms of the lever.

In the accompanying drawing there are illustrated in side elevation, in a manner entirely diagrammatic and solely by way of example, two methods of construction of the invention applied to the rear spring of an automobile vehicle.

Figure 1 shows a simple method of construction wherein the end of the spring bears directly on the reducing lever.

Figures 2, 3 and 4 are diagrams showing respectively the variations of the flexibility in the case of a suspension of constant flexibility, of a suspension of which the flexibility varies in proportion to the weight (arrangement of Figure 1) and of a suspension of which the flexibility varies according to a law arbitrarily chosen (device according to Figure 5).

Finally Figure 5 is a similar view to Figure 1 showing a method of construction of the invention wherein the end of the spring bears upon inclines of suitably determined outline.

In the most simple form of construction of the invention, form of construction which is shown in Figure 1, the lever 1 can oscillate at one of its ends about an axis $a$ secured to the chassis 2 and carries at its other end $b$ the wheel 3.

A spring 4, which in this form of construction is in the form of an arc of a circle, is secured to the chassis 2 and bears at its free end at a point $c$ on the lever.

The position, at rest, of the point of support $c$ is suitably chosen according to the ratio of reduction which it is desired to obtain for a given position of the chassis 2 in relation to the wheel 3.

This ratio which evidently depends upon the respective lengths of the arms $ab$ and $ac$ of the lever is equal to $$\frac{ab}{ac}.$$

On the other hand the flexibility F of the whole depends upon the ratio of the arms of the lever and on the flexibility $f$ of the spring 4 according to the equation $$F = f\frac{(ab)^2}{ac}.$$

The operation of the device will be readily understood. When the wheel 3 and the chassis 2 move towards one another, either under the action of a supplementary load on the chassis 2 or by the action of a shock on the wheel 3, the lever 1 oscillates about the axis $a$ and will occupy a position 1' relatively to the chassis 2, weighing down the spring 4 on the free end of which it rests.

The flexure of the spring 4 is in the form of an arc of dimensioning curvature, the chord of which arc increases and the free end of the spring 4 moves along the lever from the position $c$ to the position $c'$ for which $ac' > ac$.

The length $ab$ of the long arm of the lever remaining the same the ratio of the arms of the levers becomes $$\frac{ab}{ac'} \big/ \frac{ab}{ac}.$$

The flexibility F of the spring 4 remaining constant the flexibility F' of the whole in the new position has become $$F' = f\frac{(ab)^2}{ac'} < F = f\frac{(ab)^2}{ac}$$

consequently the flexibility of the whole has been reduced under the action of a supplementary load, this latter being constituted either by a weight added on the chassis 2 or results from a shock to the wheel 3.

It will be understood that a device described and shown solely by way of example may also be carried out with one or more springs different to that shown, for example one or more complete springs acting on the lever by their mid point and secured to the chassis at their ends, as also by means of springs arranged in any other manner.

The reducing device may also comprise either a combination of levers or any other members of suitable shape and of suitable number the essential characteristic of the invention residing in the fact that the weighing down of the spring under the action of the load or shock actuates and causes the reduction of the reducing device, interposed between the wheel and the spring, to be varied, this variation being adapted to be effected and in a direction and to a value in accordance with the result it is desired to obtain.

It is thus possible, in accordance with the invention to vary the flexibility of the spring according to any law. This result is obtained by means of the device shown in Figure 5. In this method of construction of the invention the end $c$ of the spring 4, instead of bearing directly upon the reducing lever 1 bears upon a cam 5 which may for example be formed of two slopes of suitable outline. By a judicious choice of this outline a variation of the flexibility which may be desired can be obtained.

The diagrams of Figures 2 to 4 show by way of example the manner in which the flexibility of the suspension spring of the vehicle may be varied. In these diagrams the loads supported are indicated by the abscissæ P, P', P'', P'''; the flexibilities are indicated on the ordinates F, F', F'', F'''.

Figure 2 shows the case of an ordinary suspension with constant flexibility; the diagram shows that in this case the flexibility does not vary with the load supported.

Figure 3 shows the variation obtained with the device of Figure 1; in this case the flexibility varies in a uniform manner inversely to the load.

Figure 4 shows an example of the result which may be obtained with the device in Figure 5 by choosing for the material 5 suitable outlines; it will be seen that it is thus possible to give to the suspension a constant flexibility between A and B (that is to say for a load included between P and P') then a flexibility which rapidly decreases between B and C (that is to say for loads included between P' and P''), finally the flexibility decreasing still more rapidly between C and D (for loads included between P'' and P'''), this last rapid variation preventing the body from pressing hard even in the case of a vehicle which is considerably over-loaded.

In the form of construction of the invention shown in Figure 5 the spring assumes the particular shape indicated on the drawing; it is secured by means of flanges to a member 6 also provided with the axis $a$ of oscillation of the lever 1.

It will be understood that the invention is not limited to the particular type of spring shown in the drawings. The cantilever spring shown may be replaced by a spring with blades supporting at its centre a collar fitted with a roller, this latter bearing and sliding on the part forming the cam of the reducing lever.

Having thus described my invention what I claim as new and desire to secure by Letters Patent is:—

1. In a device for varying the flexibility of the suspension of a vehicle the combination comprising a chassis, a suspension spring composed of superposed blades of different lengths, the larger end of said spring being attached to said chassis, a roller carried at the thin end of said spring, a lever having one end pivoted to said chassis, a road wheel rotatably carried by the other end of said lever, and a cam member carried by said lever intermediate of its ends, said cam being adapted to co-operate with the roller at the end of the spring so as to vary the flexibility of said spring in accordance with the loading of the vehicle.

2. A device according to claim 1, the flexibility remaining constant for a given range, then decreasing for a given range, and then decreasing more rapidly for another given range.

JACQUES POYET.